US012649456B2

(12) United States Patent
Huh

(10) Patent No.: US 12,649,456 B2
(45) Date of Patent: Jun. 9, 2026

(54) HYBRID ELECTRIC VEHICLE AND A DRIVING CONTROL METHOD THEREFOR

(71) Applicants:HYUNDAI MOTOR COMPANY, Seoul (KR); KIA CORPORATION, Seoul (KR)

(72) Inventor: Jee Wook Huh, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 164 days.

(21) Appl. No.: 18/376,191

(22) Filed: Oct. 3, 2023

(65) Prior Publication Data

US 2024/0375639 A1 Nov. 14, 2024

(30) Foreign Application Priority Data

May 10, 2023 (KR) ........................ 10-2023-0060638

(51) Int. Cl.
*B60W 20/40* (2016.01)
*B60K 6/40* (2007.10)
(Continued)

(52) U.S. Cl.
CPC .............. *B60W 20/40* (2013.01); *B60K 6/40* (2013.01); *B60W 10/02* (2013.01); *B60W 10/06* (2013.01);
(Continued)

(58) Field of Classification Search
CPC ...... B60W 20/40; B60W 10/02; B60W 10/06; B60W 10/08; B60W 20/13; B60W 2510/0657; B60W 2510/08; B60W 2510/244; B60W 2710/023; B60W 2710/0666; B60W 2710/083; B60W 2710/244; B60W 2510/081; B60W 2540/10; B60W 2710/021; B60W 2710/0644; B60W 2710/0677; B60W 20/11; B60W 20/20; B60W 20/15; B60W 2710/06; B60W 2710/08; B60K 6/40;
(Continued)

(56) References Cited

U.S. PATENT DOCUMENTS 9,140,343 B1 9/2015 Kim et al.
12,330,622 B2 * 6/2025 Park ...................... B60W 10/08
(Continued)

FOREIGN PATENT DOCUMENTS

JP 2021160451 A 10/2021
JP 7107637 B2 * 7/2022 ............. Y02T 10/62
(Continued)

*Primary Examiner* — Brian P Sweeney
(74) *Attorney, Agent, or Firm* — Lempia Summerfield Katz LLC

(57) ABSTRACT

A hybrid electric vehicle and a driving control method therefor are disclosed. The hybrid electric vehicle includes an engine clutch connected at one end of the engine clutch to a first motor, which is directly connected to an engine, and connected at the other end of the engine clutch to a second motor. The hybrid electric vehicle also includes a battery electrically connected to the first motor and the second motor. The hybrid electric vehicle also includes a controller configured to determine an operating point of the second motor, an operating point of the engine, and an operating point of the first motor.

11 Claims, 8 Drawing Sheets

(51) Int. Cl.

| | |
|---|---|
| *B60W 10/02* | (2006.01) |
| *B60W 10/06* | (2006.01) |
| *B60W 10/08* | (2006.01) |
| *B60W 20/13* | (2016.01) |
| *B60K 6/46* | (2007.10) |

(52) U.S. Cl.
CPC ............ *B60W 10/08* (2013.01); *B60W 20/13* (2016.01); *B60K 6/46* (2013.01); *B60W 2510/0657* (2013.01); *B60W 2510/08* (2013.01); *B60W 2510/244* (2013.01); *B60W 2710/023* (2013.01); *B60W 2710/0666* (2013.01); *B60W 2710/083* (2013.01); *B60W 2710/244* (2013.01); *B60Y 2200/92* (2013.01)

(58) Field of Classification Search
CPC .......... B60K 6/46; B60K 6/387; B60K 6/442; B60K 6/38; B60K 6/24; B60K 6/26; B60K 6/28; B60K 6/48; B60Y 2200/92; Y02T 10/62
See application file for complete search history.

(56) References Cited

U.S. PATENT DOCUMENTS

| | | | |
|---|---|---|---|
| 2003/0173123 | A1 | 9/2003 | Nakanowatari |
| 2018/0236998 | A1 | 8/2018 | Ono et al. |
| 2019/0351894 | A1 | 11/2019 | Nakagawara et al. |

FOREIGN PATENT DOCUMENTS

| | | | |
|---|---|---|---|
| KR | 20130138383 | A | 12/2013 |
| KR | 20210130507 | A | 11/2021 |

* cited by examiner

FIG. 3

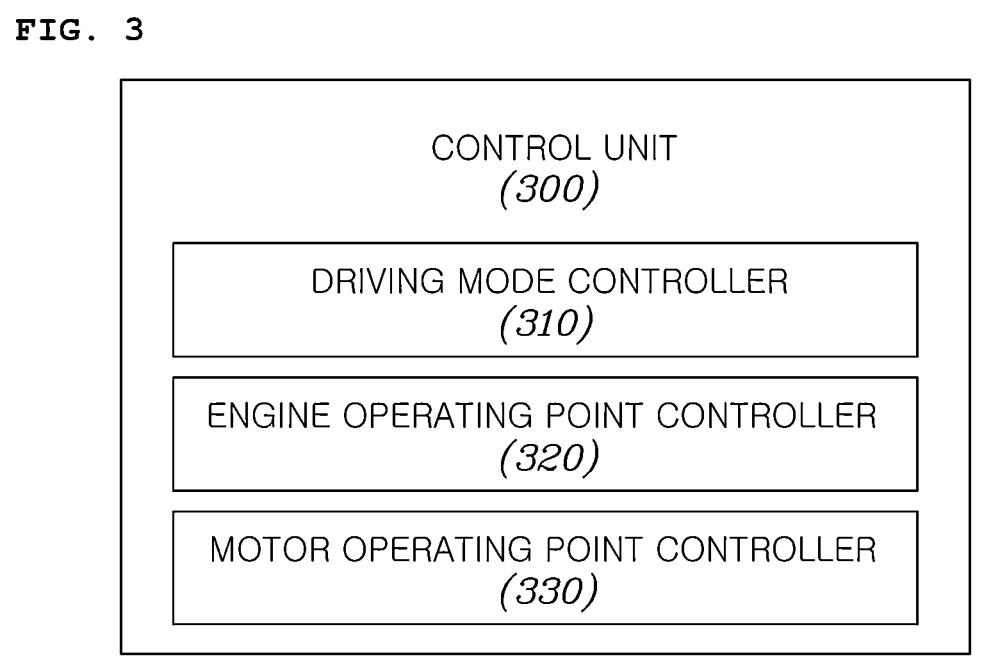

CONTROL UNIT
(300)

DRIVING MODE CONTROLLER
(310)

ENGINE OPERATING POINT CONTROLLER
(320)

MOTOR OPERATING POINT CONTROLLER
(330)

FIG. 8

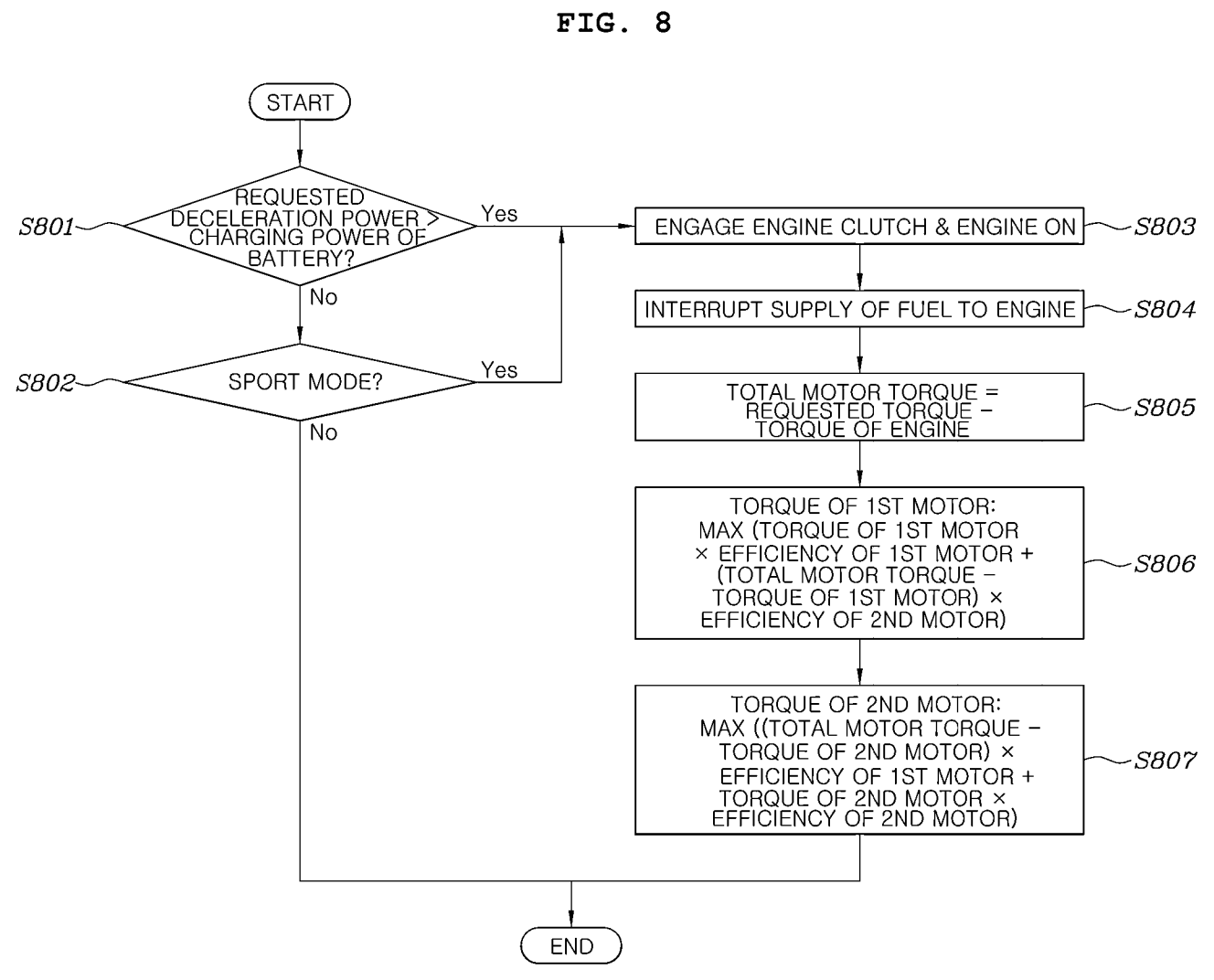

START

S801 — REQUESTED DECELERATION POWER > CHARGING POWER OF BATTERY?

Yes → S803 — ENGAGE ENGINE CLUTCH & ENGINE ON

S804 — INTERRUPT SUPPLY OF FUEL TO ENGINE

S805 — TOTAL MOTOR TORQUE = REQUESTED TORQUE − TORQUE OF ENGINE

S806 — TORQUE OF 1ST MOTOR: MAX (TORQUE OF 1ST MOTOR × EFFICIENCY OF 1ST MOTOR + (TOTAL MOTOR TORQUE − TORQUE OF 1ST MOTOR) × EFFICIENCY OF 2ND MOTOR)

S807 — TORQUE OF 2ND MOTOR: MAX ((TOTAL MOTOR TORQUE − TORQUE OF 2ND MOTOR) × EFFICIENCY OF 1ST MOTOR + TORQUE OF 2ND MOTOR × EFFICIENCY OF 2ND MOTOR)

No → S802 — SPORT MODE?

Yes ↑

No → END

HYBRID ELECTRIC VEHICLE AND A DRIVING CONTROL METHOD THEREFOR

CROSS-REFERENCE TO RELATED APPLICATION

This application claims the priority to and benefit of Korean Patent Application No. 10-2023-0060638, filed on May 10, 2023 in the Korean Intellectual Property Office, the entire disclosure of which is incorporated herein by reference.

TECHNICAL FIELD

The present disclosure relates to a hybrid electric vehicle and a driving control method therefor that are capable of driving a plurality of motors and an engine with optimal efficiency.

BACKGROUND

Recently, with increased concern about the environment, eco-friendly vehicles, which are provided with electric motors as a power source, have been actively developed. Eco-friendly vehicles are also called motorized vehicles, and hybrid electric vehicles (HEVs) and electric vehicles (EVs) have been developed as representative examples of eco-friendly vehicles.

In the case of a hybrid electric vehicle ("HEV"), a motor as well as an engine may be provided as a power source, and the engine and the motor may be disposed on respective ends of an engine clutch based on the structure of a powertrain thereof. In this case, the engine and the motor may be connected to or disconnected from each other based on the engaged or disengaged state of the engine clutch. In the state in which the engine clutch is engaged, the engine and the motor are connected to each other, with the result that an engine shaft and a motor shaft rotate together.

In order to increase the profitability of a hybrid electric vehicle and improve the fuel efficiency thereof, technology for placing a motor at various positions has been actively researched and developed. In particular, technology for placing a plurality of motors at different positions has been developed.

Therefore, in a hybrid electric vehicle employing such a motor mounting structure, technology for improving the driving efficiency of the vehicle through cooperative control considering the efficiency of an overall system including an engine and a plurality of motors is also required.

The information disclosed in this Background of the Disclosure section is only for enhancement of understanding of the general background of the disclosure and should not be taken as an acknowledgement or any form of suggestion that this information forms the related art already known to a person having ordinary skill in the art.

SUMMARY

The present disclosure has been made in view of the above problems, and one object of the present disclosure is to provide a hybrid electric vehicle capable of being driven with optimal efficiency through cooperative control of an engine and a plurality of motors and a driving control method therefor.

However, the objects to be accomplished by the disclosure are not limited to the above-mentioned objects, and other objects not mentioned herein should be clearly understood by those having ordinary skill in the art from the following description.

In accordance with an aspect of the present disclosure, a hybrid electric vehicle includes an engine clutch connected at one end of the engine clutch to a first motor and connected at the other end of the engine clutch to a second motor. The first motor is directly connected to an engine. The hybrid electric vehicle also includes a battery electrically connected to the first motor and the second motor. The hybrid electric vehicle also includes a controller configured, when the engine is driven in the disengaged state of the engine clutch, to determine an operating point of the second motor based on requested driving power. The controller is also configured to determine an operating point of the engine based on output efficiency of each of the engine and the first motor and charging efficiency of the battery. The controller is also configured to determine an operating point of the first motor based on an amount of discharge of the battery according to output of the second motor and torque of the engine according to the operating point of the engine.

In an embodiment, the controller may perform comparison between the requested driving power and the maximum power of the second motor and may control engagement and disengagement of the engine clutch based on a result of the comparison.

In an embodiment, the controller may further consider the state of charge (SOC) of the battery to control engagement and disengagement of the engine clutch.

In an embodiment, the controller may control whether to drive the engine based on at least one of whether there is a request for heating or the state of charge (SOC) of the battery.

In an embodiment, when the engine is driven in the disengaged state of the engine clutch, the controller may control engagement and disengagement of the engine clutch based on the speed of the second motor and requested driving torque.

In accordance with another aspect of the present disclosure, a hybrid electric vehicle includes an engine clutch connected at one end of the engine clutch to a first motor and connected at the other end of the engine clutch to a second motor. The first motor is directly connected to an engine. The hybrid electric vehicle also includes a battery electrically connected to the first motor and the second motor. The hybrid electric vehicle also includes a controller configured, when the engine is driven in the engaged state of the engine clutch, to determine an operating point of the engine based on a predetermined efficiency map. The controller is also configured to determine total motor torque to be output by a motor unit including the first motor and the second motor based on the operating point of the engine. The controller is also configured to determine an operating point of each of the first motor and the second motor based on total motor applied torque causing the motor unit to output the total motor torque and whether the battery is charged or discharged.

In an embodiment, the controller may perform comparison between requested driving power and the maximum power of the second motor and may control engagement and disengagement of the engine clutch based on a result of the comparison.

In an embodiment, the controller may further consider the state of charge (SOC) of the battery to control engagement and disengagement of the engine clutch.

In an embodiment, the total motor applied torque may be determined in consideration of the total motor torque and efficiency of each of the first motor and the second motor.

In an embodiment, when the battery is charged, the controller may determine the operating point of each of the first motor and the second motor such that the total motor applied torque is equal to or greater than a predetermined first value.

In an embodiment, when the battery is discharged, the controller may determine the operating point of each of the first motor and the second motor such that the total motor applied torque is equal to or less than a predetermined second value.

In an embodiment, the efficiency map may be sectioned into a plurality of regions at least by a first line set to correspond to an optimum operating line (OOL) of the engine, a second line set to have a predetermined difference in engine efficiency from the first line, or a third line set to maximize part load of the engine.

In an embodiment, when the requested driving power corresponds to a region below the first line, the controller may determine the operating point of the engine to be an operating point on the first line.

In an embodiment, when the requested driving power corresponds to a region between the first line and the second line, the controller may determine the operating point of the engine to be an operating point on the second line.

In an embodiment, when the requested driving power corresponds to a region between the second line and the third line, the controller may determine the operating point of the engine to be an operating point causing system efficiency to be equal to or greater than a predetermined value in the region between the second line and the third line. The system efficiency is determined based on output efficiency of the engine, efficiency of transfer of power to driving wheels, and charging/discharging efficiency of the battery.

In an embodiment, when the requested driving power corresponds to a region above the third line, the controller may determine the operating point of the engine to be an operating point on the third line.

In accordance with still another aspect of the present disclosure, a hybrid electric vehicle includes an engine clutch connected at one end of the engine clutch to a first motor and connected at the other end of the engine clutch to a second motor. The first motor is directly connected to an engine. The hybrid electric vehicle also includes a battery electrically connected to the first motor and the second motor. The hybrid electric vehicle also includes a controller configured, when supply of fuel to the engine is interrupted in the engaged state of the engine clutch, to determine total motor torque to be output by a motor unit including the first motor and the second motor based on torque of the engine according to interruption of supply of fuel to the engine and requested deceleration torque. The controller is also configured to determine, based on output efficiency of each of the first motor and the second motor, an operating point of each of the first motor and the second motor such that total motor applied torque causing the motor unit to output the total motor torque is equal to or greater than a predetermined value.

In an embodiment, when a predetermined engine braking condition is satisfied, the controller may perform control such that the engine clutch is engaged and the supply of fuel to the engine is interrupted.

In an embodiment, the controller may determine whether the predetermined engine braking condition is satisfied based on the state of charge (SOC) of the battery and a driver setting mode.

In accordance with yet another aspect of the present disclosure, a method of controlling driving of a hybrid electric vehicle includes controlling engagement and disengagement of an engine clutch and driving of an engine based on whether a predetermined condition is satisfied. The engine clutch is connected at one end of the engine clutch to a first motor and connected at the other end of the engine clutch to a second motor. The first motor is directly connected to the engine. The method of controlling driving of a hybrid electric vehicle also includes, when the engine is driven in the disengaged state of the engine clutch, determining an operating point of the second motor based on requested driving power, an operating point of the engine based on output efficiency of each of the engine and the first motor and charging efficiency of a battery, and an operating point of the first motor based on an amount of discharge of the battery according to output of the second motor and torque of the engine according to the operating point of the engine. The method of controlling driving of a hybrid electric vehicle also includes, when the engine is driven in the engaged state of the engine clutch, determining an operating point of the engine based on a predetermined efficiency map, total motor torque to be output by a motor unit including the first motor and the second motor based on the operating point of the engine, and an operating point of each of the first motor and the second motor based on total motor applied torque causing the motor unit to output the total motor torque and whether the battery is charged or discharged.

BRIEF DESCRIPTION OF THE DRAWINGS

The above and other objects, features, and other advantages of the present disclosure should be more clearly understood from the following detailed description taken in conjunction with the accompanying drawings, in which:

FIG. 3 is a diagram illustrating a control unit of the hybrid electric vehicle according to an embodiment of the present disclosure;

FIG. 8 is a flowchart illustrating a process of controlling the hybrid electric vehicle in a third driving mode according to an embodiment of the present disclosure.

DETAILED DESCRIPTION

Figure 1:
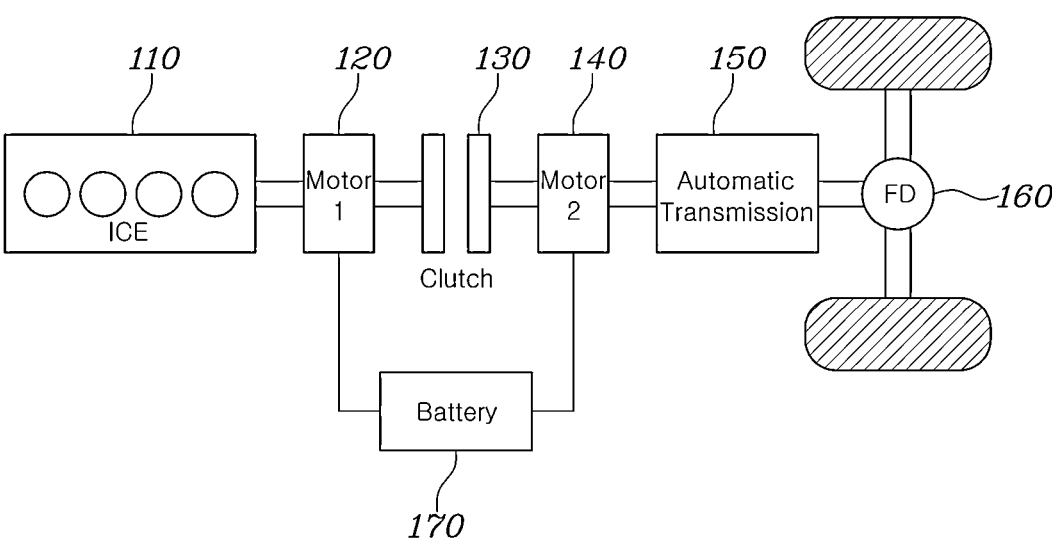
FIG. 1 is a diagram illustrating a powertrain of a hybrid electric vehicle according to an embodiment of the present disclosure.

Hereinafter, the embodiments disclosed in the present specification are described in detail with reference to the accompanying drawings. The same or similar elements are denoted by the same reference numerals even though the elements are depicted in different drawings. Redundant descriptions thereof have been omitted. In the following description, with respect to constituent elements used in the following description, the suffixes "module" and "unit" are used only in consideration of facilitation of description and do not have mutually distinguished meanings or functions. In the following description of the embodiments disclosed in the present specification, a detailed description of known functions and configurations incorporated herein has been omitted when the same may make the subject matter of the embodiments disclosed in the present specification rather unclear. In addition, the accompanying drawings are provided only for a better understanding of the embodiments disclosed in the present specification and are not intended to limit the technical ideas disclosed in the present disclosure. Therefore, it should be understood that the accompanying drawings include all modifications, equivalents, and substitutions within the scope and sprit of the present disclosure.

It should be understood that although the terms "first", "second", etc., may be used herein to describe various components, these components should not be limited by these terms. These terms are only used to distinguish one component from another component.

It should be understood that when a component is referred to as being "connected to" or "coupled to" another component, it may be directly connected to or coupled to another component, or intervening components may be present. On the other hand, when a component is referred to as being "directly connected to" or "directly coupled to" another component, there are no intervening components present.

As used herein, the singular form is intended to include the plural forms as well, unless the context clearly indicates otherwise. When a component, device, element, or the like of the present disclosure is described as having a purpose or performing an operation, function, or the like, the component, device, or element should be considered herein as being "configured to" meet that purpose or to perform that operation or function.

It should be further understood that the terms "comprises", "comprising", "includes", and/or "including", when used herein, specify the presence of stated features, integers, steps, operations, elements, components, or combinations thereof. However, these terms do not preclude the presence or addition of one or more other features, integers, steps, operations, elements, components, or combinations thereof.

In addition, the terms "unit" and "control unit" forming part of the names of the motor control unit (MCU) and the hybrid control unit (HCU) are merely terms that are widely used in the naming of a controller for controlling a specific function of a vehicle and should not be construed as meaning a generic function unit. For example, in order to control the function peculiar thereto, each controller may include a communication device, which communicates with other controllers or sensors. Each controller may also include a memory, which stores therein an operating system, logic commands, and input/output information. Each controller may also include one or more processors, which perform determinations, calculations, and decisions necessary for control of the function peculiar thereto.

Prior to describing a method of controlling driving of a hybrid electric vehicle according to embodiments of the present disclosure, the structure and the control system of a hybrid electric vehicle to which the embodiments are applicable are described first.

FIG. 1 is a diagram showing an example of the configuration of a powertrain of a hybrid electric vehicle according to an embodiment of the present disclosure.

FIG. 1 illustrates a powertrain of a hybrid electric vehicle equipped with a parallel-type hybrid system, in which two motors 120 and 140 and an engine clutch 130 are mounted between an internal combustion engine (ICE) 110 and a transmission 150. Such a parallel-type hybrid system is also called a transmission mounted electric drive (TMED) hybrid system because the motor 140 is connected to an input side of the transmission 150 at all times.

Among the two motors 120 and 140, the first motor 120 may be disposed between the engine 110 and one end of the engine clutch 130, and the shaft of the engine 110 and the shaft of the first motor 120 may be directly connected to each other so as to be rotated together at all times.

One end of the shaft of the second motor 140 may be connected to the other end of the engine clutch 130, and the other end of the shaft of the second motor 140 may be connected to the input side of the transmission 150.

The second motor 140 may have a greater output than the first motor 120 and may serve as a driving motor. The first motor 120 may function as a starter motor that cranks the engine 110 when starting the engine 110, may collect the rotational energy of the engine 110 through electricity generation in an engine-off state, and may generate electricity using power of the engine 110 when the engine 110 is in an operating state.

In the hybrid electric vehicle equipped with the powertrain shown in FIG. 1, when a driver depresses an accelerator pedal after commencing movement of the vehicle (e.g., HEV ready), the second motor 140 is first driven using power of a battery 170 in the state in which the engine clutch 130 is open. Accordingly, the power of the second motor 140 is transmitted to the wheels via the transmission 150 and a final drive (FD) 160 in order to rotate the wheels (i.e., an electric vehicle (EV) mode). When greater driving force is needed as the vehicle is gradually accelerated, the first motor 120 may be operated to crank the engine 110.

When a difference in the rotational speed between the engine 110 and the second motor 140 is within a predetermined range after starting up the engine 110, the engine clutch 130 is locked, with the result that the engine 110 and the second motor 140 are rotated together (i.e., transition from the EV mode to an HEV mode). Accordingly, through a torque blending process, the output of the second motor 140 may be reduced, and the output of the engine 110 may be increased, with the result that a driver requested torque may be satisfied. In the HEV mode, the engine 110 may satisfy most of the requested torque, and a difference between the engine torque and the requested torque may be compensated by at least one of the first motor 120 or the second motor 140. For example, when the engine 110 outputs a torque greater than the requested torque in consideration of the efficiency of the engine 110, the first motor 120 or the second motor 140 may generate electricity in an amount corresponding to the surplus of the engine torque. When the engine torque is less than the requested torque, at least one of the first motor 120 or the second motor 140 may output a torque corresponding to the shortfall of the engine torque.

When a predetermined engine OFF condition is satisfied, for example, when the vehicle is decelerated, the engine clutch 130 is opened, and the engine 110 is stopped (i.e., transition from the HEV mode to the EV mode). During deceleration, the vehicle charges the battery 170 through the second motor 140 using the driving force of the wheels. This is referred to as recovery of braking energy or regenerative braking.

In general, the transmission 150 may be implemented as a multiple-range transmission or a multiple-disc clutch transmission, for example, a dual-clutch transmission (DCT).

Figure 2:
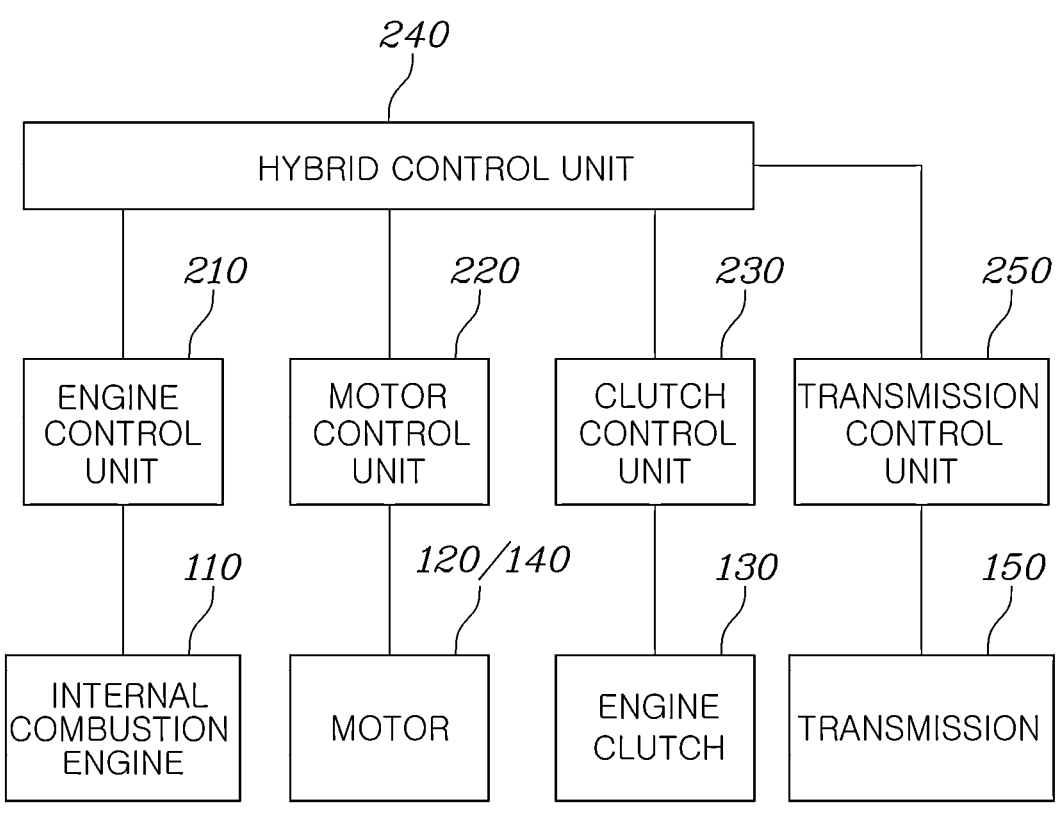
FIG. 2 is a diagram illustrating a control system of the hybrid electric vehicle according to an embodiment of the present disclosure.

FIG. 2 is a diagram showing an example of the configuration of a control system of the hybrid electric vehicle according to an embodiment of the present disclosure.

Referring to FIG. 2, in the hybrid electric vehicle to which the embodiments of the present disclosure are applicable, the internal combustion engine 110 may be controlled by an engine control unit 210, the torque of the first motor 120 and the second motor 140 may be controlled by a motor control unit (MCU) 220, and the engine clutch 130 may be controlled by the clutch control unit 230. Here, the engine control unit 210 is referred to as an engine management system (EMS). In addition, the transmission 150 is controlled by a transmission control unit 250.

The motor control unit 220 may control a gate drive unit (not shown) using a control signal in the form of pulse width modulation (PWM) based on the motor angle of each of the motors 120 and 140, phase voltage, phase current, and requested torque. Accordingly, the gate drive unit may control an inverter (not shown) configured to drive each of the motors 120 and 140.

Each of the control units may be connected to a hybrid control unit (HCU) 240, which is a higher-level control unit configured to control the overall operation of the powertrain, including a mode switching process. Each of the control units may provide information necessary for engine clutch control at the time of switching a drive mode or shifting gears and/or information necessary for engine stop control to the hybrid control unit 240 or may perform operation in response to a control signal under the control of the hybrid control unit 240.

For example, the hybrid control unit 240 determines whether to perform mode switching between an EV mode and an HEV mode or between a charge-depleting (CD) mode and a charge-sustaining (CS) mode (in the case of a plug-in hybrid electric vehicle (PHEV)) based on the driving state of the vehicle. To this end, the hybrid control unit 240 determines the time at which to disengage (open) the engine clutch 130 and performs hydraulic pressure control when the engine clutch is disengaged. In addition, the hybrid control unit 240 may determine the state of the engine clutch 130 (lock-up, slip, open, etc.) and may control the time at which to stop injecting fuel into the engine 110. In addition, the hybrid control unit may transmit a torque command for control of the torque of the first motor 120 to the motor control unit 220 in order to control stopping of the engine. Thus, recovery of rotational energy from the engine may be controlled. In addition, in order to satisfy requested torque, the hybrid control unit 240 may determine the state of each of the power sources 110, 120, and 140, may determine required driving force that each of the power sources 110, 120, and 140 needs to output based on the determined state, and may transmit torque commands to the control units 210 and 220 for control of the power sources.

Of course, it should be apparent to those having ordinary skill in the art that the connection relationships between the control units and the functions/division of the control units described above are merely illustrative and are not limited by the names thereof. For example, the hybrid control unit 240 may be implemented such that the function thereof is provided by any one of the control units other than the hybrid control unit 240 or such that the function thereof is distributed and provided by two or more of the other control units.

It should be apparent to those having ordinary skill in the art that the configuration described above with reference to FIGS. 1 and 2 is merely an exemplary configuration of the hybrid electric vehicle, and the structure of the hybrid electric vehicle to which the embodiments are applicable is not limited thereto.

The present disclosure proposes technology for causing the engine and the plurality of motors, which serve as power sources, to operate at optimal operating points for each driving mode of the vehicle based on whether or not the engine clutch is in an engaged state and whether or not the engine is operating. Thus, the efficiency of the overall system may be improved.

Hereinafter, the hybrid electric vehicle according to an embodiment of the present disclosure is described in detail with reference to FIGS. 3-8.

FIG. 3 is a diagram showing the configuration of a control unit of the hybrid electric vehicle according to an embodiment of the present disclosure.

Referring to FIG. 3, a control unit 300 according to an embodiment of the present disclosure may include a driving mode controller 310, an engine operating point controller 320, and a motor operating point controller 330. However, the components shown in FIG. 3 are main components related to description of the embodiment of the present disclosure. In practice, the control unit 300 may include more or fewer components than those shown in FIG. 3.

The driving mode controller 310 may control engagement and disengagement of the engine clutch 130 and whether to drive the engine 110 according to a driving condition to determine a driving mode of the hybrid electric vehicle.

The driving mode may include at least a first driving mode, a second driving mode, and a third driving mode.

The first driving mode may be a mode in which the hybrid electric vehicle is driven in a disengaged state of the engine clutch 130. In detail, the first driving mode may include a 1-1$^{st}$ driving mode in which the engine 110 is not driven and may include a 1-2$^{nd}$ driving mode in which the engine 110 is driven.

The second driving mode may be a mode in which the hybrid electric vehicle is driven in the engaged state of the engine clutch 130 and the operating state of the engine 110. In detail, the second driving mode may include a 2-1$^{st}$ driving mode in which the first motor 120 charges the battery 170 using the power of the engine 110 and may include a 2-2$^{nd}$ driving mode in which the first motor 120 is driven through discharge of the battery 170.

The third driving mode may be a mode in which the engine clutch 130 is engaged and supply of fuel to the engine 110 is interrupted.

The driving mode controller 310 may compare requested driving power with the maximum power of the second motor 140 and may control engagement and disengagement of the engine clutch 130 based on a result of the comparison.

In addition, the driving mode controller 310 may further consider the state of charge (SOC) of the battery 170 to control engagement and disengagement of the engine clutch 130.

For example, when the sum of a value set for each SOC of the battery 170 and the requested driving power is equal to or less than the maximum power of the second motor 140, the driving mode controller 310 may perform control such that the engine clutch 130 is disengaged and the hybrid electric vehicle is driven in the first driving mode.

In this case, since the second motor 140 alone satisfies the requested driving power, the second motor 140 may output the requested driving power, and the engine 110 and the first motor 120 may not operate. In particular, since the SOC of the battery 170 is further considered, discharge of the battery 170 may be minimized even when the second motor 140 alone satisfies the requested driving power.

In addition, the driving mode controller 310 may control whether to drive the engine 110 based on at least one of whether there is a request for heating or the SOC of the battery 170.

For example, in the disengaged state of the engine clutch 130, when there is a request for heating or when the SOC of the battery 170 is equal to or less than a predetermined value, the driving mode controller 310 may perform control such that the engine 110 is driven and the hybrid electric vehicle is driven in the 1-2$^{nd}$ driving mode. In this way, when the engine 110 is driven, heat generated from the engine may be used for heating, or discharge of the battery 170 may be reduced. On the contrary, when there is no request for heating or when the SOC of the battery 170 is sufficient, the driving mode controller 310 may perform control such that the engine 110 is not driven and the hybrid electric vehicle is driven in the 1-1$^{st}$ driving mode.

On the other hand, when the engine 110 is driven in the disengaged state of the engine clutch 130, i.e., in the 1-2$^{nd}$ driving mode, the driving mode controller 310 may control engagement and disengagement of the engine clutch 130 based on the speed of the second motor 140 and the requested driving torque.

For example, when the speed of the second motor 140 is lower than a predetermined speed or when the requested driving torque is less than predetermined torque, the driving mode controller 310 may control the engine clutch 130 to be maintained in the disengaged state. If not, the driving mode controller 310 may control the engine clutch 130 to be engaged.

Accordingly, it is possible to prevent the engine 110 from being driven at a low speed due to engagement of the engine clutch 130 in the state in which the speed of the second motor 140 is not sufficient. Thus, operational stability of the engine 110 may be ensured.

In addition, it is possible to prevent the battery 170 from being overcharged due to engagement of the engine clutch 130 in the state in which the requested driving torque is not sufficient. Thus, the efficiency of the overall system of the vehicle may be improved.

When the sum of the value set for each SOC of the battery 170 and the requested driving power exceeds the maximum power of the second motor 140, the driving mode controller 310 may perform control such that the engine clutch 130 is engaged and the hybrid electric vehicle is driven in the second driving mode.

In this case, the engine 110, the first motor 120, and the second motor 140 may operate in the engaged state of the engine clutch 130 and may share and output the requested driving power. In addition, the driving mode controller 310 may perform control, according to the level of the requested driving power, such that the hybrid electric vehicle is driven in the 2-1$^{st}$ driving mode and the first motor 120 charges the battery 170 using the power of the engine 110 or such that the hybrid electric vehicle is driven in the 2-2$^{nd}$ driving mode and the power of the engine 110 is transmitted to the driving wheels.

Meanwhile, when a predetermined engine braking condition is satisfied, the driving mode controller 310 may perform control such that supply of fuel to the engine 110 is interrupted in the engaged stage of the engine clutch 130 and the hybrid electric vehicle is driven in the third driving mode.

In this case, the predetermined engine braking condition may be determined based on the SOC of the battery 170 and a driver setting mode. For example, when the SOC of the battery 170 is a fully charged state, when requested deceleration power is greater than the charging power of the battery 170, or when the driver setting mode is a mode in which acceleration is started in a section in which the speed of the engine 110 is high (e.g. a sport mode), the driving mode controller 310 may perform control such that the engine clutch 130 is engaged and supply of fuel to the engine 110 is interrupted.

In this case, in the deceleration situation, a portion of the requested deceleration torque may be satisfied by the torque of the engine 110 caused by interruption of supply of fuel to the engine 110, and the remaining portion of the requested deceleration torque may be satisfied by the first motor 120 and the second motor 140.

The engine operating point controller 320 and the motor operating point controller 330 may control the operating points of the respective power sources according to the driving mode determined by the driving mode controller 310.

When the hybrid electric vehicle is driven in the 1-1$^{st}$ driving mode, i.e., when the engine clutch 130 is disengaged and the engine 110 is not driven, the motor operating point controller 330 may determine the operating point of the second motor 140 based on the requested driving power. In this case, since the first motor 120 and the engine 110 do not operate, the operating point of the engine 110 and the operating point of the first motor 120 may not be considered.

When the hybrid electric vehicle is driven in the 1-2$^{nd}$ driving mode, i.e., when the engine 110 is driven in the disengaged state of the engine clutch 130, the motor operating point controller 330 may determine the operating point of the second motor 140 based on the requested driving power, similar to when the hybrid electric vehicle is driven in the 1-1$^{st}$ driving mode.

However, since the engine 110 and the first motor 120 also operate in the 1-2$^{nd}$ driving mode, both the engine operating point controller 320 and the motor operating point controller 330 intervene in control.

In this case, the engine operating point controller 320 may determine the operating point of the engine 110 based on the output efficiency of each of the engine 110 and the first motor 120 and the charging efficiency of the battery 170. The motor operating point controller 330 may determine the operating point of the first motor 120 based on the amount of discharge of the battery 170 according to output of the second motor 140 and the torque of the engine 110 according to the operating point of the engine 110 determined by the engine operating point controller 320.

When the hybrid electric vehicle is driven in the second driving mode, i.e., when the engine 110 is driven in the engaged state of the engine clutch 130, the engine operating point controller 320 may determine the operating point of the engine 110 based on a predetermined efficiency map. A detailed description thereof is given below with reference to FIG. 4.

First, the motor operating point controller 330 determines, based on the operating point of the engine 110 determined by the engine operating point controller 320, total motor torque that all of the motors 120 and 140 are required to output.

Thereafter, the motor operating point controller 330 may determine the operating point of each of the first motor 120 and the second motor 140 based on total motor applied torque by which all of the motors 120 and 140 are caused to output the determined total motor torque and based on whether the battery 170 is charged or discharged. In this case, the motor operating point controller 330 may determine the total motor applied torque in consideration of the determined total motor torque and the efficiency of each of the first motor 120 and the second motor 140.

For example, in the 2-1$^{st}$ driving mode, i.e., when the battery 170 is charged, the motor operating point controller 330 may determine the operating point of each of the first motor 120 and the second motor 140 such that the total motor torque becomes equal to or greater than a predetermined first value. In particular, the motor operating point controller 330 may determine the operating point of each of the first motor 120 and the second motor 140 such that the total motor applied torque becomes a maximum value.

In addition, for example, in the 2-2$^{nd}$ driving mode, i.e., when the battery 170 is discharged, the motor operating point controller 330 may determine the operating point of each of the first motor 120 and the second motor 140 such that the total motor torque becomes equal to or less than a predetermined second value. In particular, the motor operating point controller 330 may determine the operating point of each of the first motor 120 and the second motor 140 such that the total motor applied torque becomes a minimum value.

When the hybrid electric vehicle is driven in the third driving mode, i.e., when supply of fuel to the engine 110 is interrupted in the engaged state of the engine clutch 130, the motor operating point controller 330 determines, based on the torque of the engine 110 caused by interruption of supply of fuel to the engine 110 and requested deceleration torque, total motor torque that all of the motors 120 and 140 are required to output.

Thereafter, the motor operating point controller 330 may determine, based on the output efficiency of each of the first motor 120 and the second motor 140, the operating point of each of the first motor 120 and the second motor 140 such that the total motor applied torque by which all of the motors 120 and 140 are caused to output the total motor torque becomes equal to or greater than a predetermined value. In particular, the motor operating point controller 330 may determine the operating point of each of the first motor 120 and the second motor 140 such that the total motor applied torque becomes a maximum value.

The control unit 300 according to the embodiment of the present disclosure may be implemented as one function of the hybrid control unit 240 described with reference to FIG. 2 in that the control unit 300 controls the engine 110, the motors 120 and 140, and the engine clutch 130. However, this is merely illustrative, and the control unit 300 according to the embodiment of the present disclosure may be implemented in other manners, for example, as a combination of a plurality of control units.

Hereinafter, a method of determining the operating point of the engine in the second driving mode is described with reference to FIG. 4.

Figure 4:
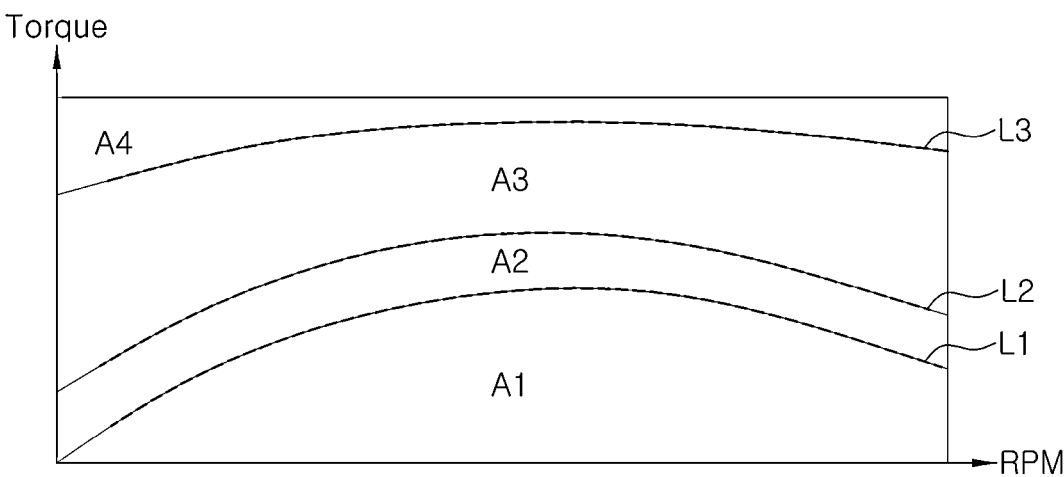
FIG. 4 is a diagram showing an efficiency map for determination of an operating point of an engine in the hybrid electric vehicle according to an embodiment of the present disclosure.

FIG. 4 is a diagram showing an efficiency map for determination of the operating point of the engine in the hybrid electric vehicle according to an embodiment of the present disclosure.

Referring to FIG. 4, in an efficiency map according to an embodiment of the present disclosure, the horizontal axis represents the speed of the engine 110, and the vertical axis represents the torque of the engine 110. The efficiency map may be sectioned into a plurality of regions at least by a first line L1 set to correspond to an optimum operating line (OOL) of the engine 110, a second line L2 set to have a predetermined difference in engine efficiency from the first line L1, and a third line L3 set to maximize part load of the engine 110.

When the requested driving power corresponds to a region A1 below the first line L1, the engine operating point controller 320 may determine the operating point of the engine 110 to be an operating point on the first line L1. Because charging/discharging efficiency is poor in the region below the first line L1, the operating point of the engine 110 may be determined to be an operating point on the first line L1, with the result that not only the efficiency of the engine 110 but also the efficiency of the system may be improved.

When the requested driving power corresponds to a region A2 between the first line L1 and the second line L2, the engine operating point controller 330 may determine the operating point of the engine 110 to be an operating point on the second line L2. In this case, the output efficiency of the engine 110 may be considered first.

When the requested driving power corresponds to a region A3 between the second line L2 and the third line L3, the engine operating point controller 330 may determine the operating point of the engine 110 to be an operating point on the region A3 between the second line L2 and the third line L3. At the operating point, the system efficiency, which is determined based on the output efficiency of the engine 110, the efficiency of transfer of power to the driving wheels, and the charging/discharging efficiency of the battery 170, is equal to or greater than a predetermined value. In particular, the operating point of the engine 110 may be determined to be an operating point at which the system efficiency is maximized. In other words, when the requested driving power corresponds to the region A3 between the second line L2 and the third line L3, the operating point of the engine 110 may be determined to be an operating point at which sufficient system efficiency is secured in the corresponding region, rather than an operating point on a specific line. In this case, the operating point of the engine 110 may vary in real time.

When the requested driving power corresponds to a region A4 above the third line L3, the engine operating point controller 330 may determine the operating point of the engine 110 to be an operating point on the third line L3. Accordingly, it is possible to prevent the engine 110 from producing maximum output.

Hereinafter, processes of controlling the driving modes and the operating points described above are described with reference to FIGS. 5-8.

Figure 5:
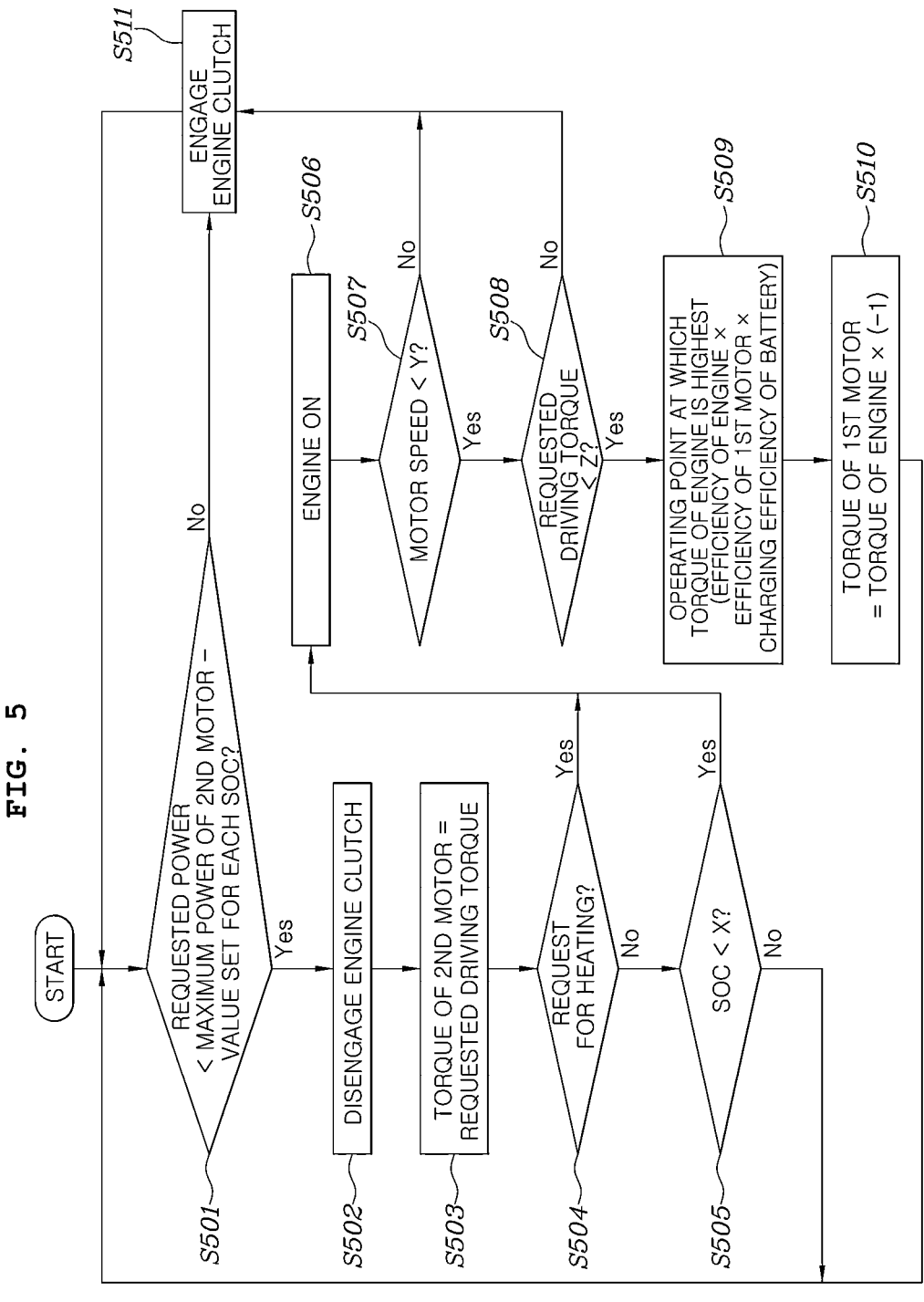
FIG. 5 is a flowchart illustrating a process of controlling the hybrid electric vehicle in a first driving mode according to an embodiment of the present disclosure.

FIG. 5 is a flowchart illustrating a process of controlling the hybrid electric vehicle in the first driving mode according to an embodiment of the present disclosure.

Referring to FIG. 5, when the sum of a value set for each SOC of the battery 170 and the requested driving power is less than the maximum power of the second motor 140 (Yes in S501), the driving mode controller 310 may determine that the second motor 140 alone is capable of satisfying the requested driving power while minimizing discharge of the battery 170 and may perform control such that the engine clutch 130 is disengaged (S502).

In this case, the motor operating point controller 330 may determine the operating point of the second motor 140 based on the requested driving power (S503).

When there is a request for heating in the disengaged state of the engine clutch 130 (Yes in S504) or when the SOC of the battery 170 is less than a predetermined value X (Yes in S505) (i.e., when the remaining capacity of the battery is low), the driving mode controller 310 may perform control such that the engine 110 is driven (S506).

In the operating state of the engine 110, when the speed of the second motor 140 is less than a predetermined value Y (Yes in S507) or when the requested driving torque is less than a predetermined value Z (Yes in S508), the driving mode controller 310 may maintain the engine clutch 130 in the disengaged state in order to secure operational stability of the engine 110. If not (No in S507 or No in S508), the driving mode controller 310 may perform control such that the engine clutch 130 is engaged, with the result that the engine 110 and the first motor 120 may rotate together with the second motor 140 (S511).

When the engine 110 is driven in the disengaged state of the engine clutch 130, the engine operating point controller 320 may determine the operating point of the engine 110 to be an operating point at which a value obtained by multiplying the output efficiency of the engine 110 by the output efficiency of the first motor 120 by the charging efficiency of the battery 170 is maximized. Accordingly, the engine 110 may be driven at an operating point at which the efficiency of the engine 110 calculated based on the charging efficiency is the highest (S509).

In addition, the motor operating point controller 330 may determine the operating point of the first motor 120 according to the torque output from the engine 110 at the operating point of the engine 110 determined by the engine operating point controller 320. For example, the torque of the first motor 120 may be determined to have the same value as the torque of the engine 110 and to act in a direction opposite the direction in which the torque of the engine 110 acts (S510).

When the sum of the value set for each SOC of the battery 170 and the requested driving power is greater than the maximum power of the second motor 140 (No in S501), the driving mode controller 310 may perform control such that the engine clutch 130 is engaged, with the result that the engine 110 is driven together with the first motor 120 and the second motor 140.

Figure 6:
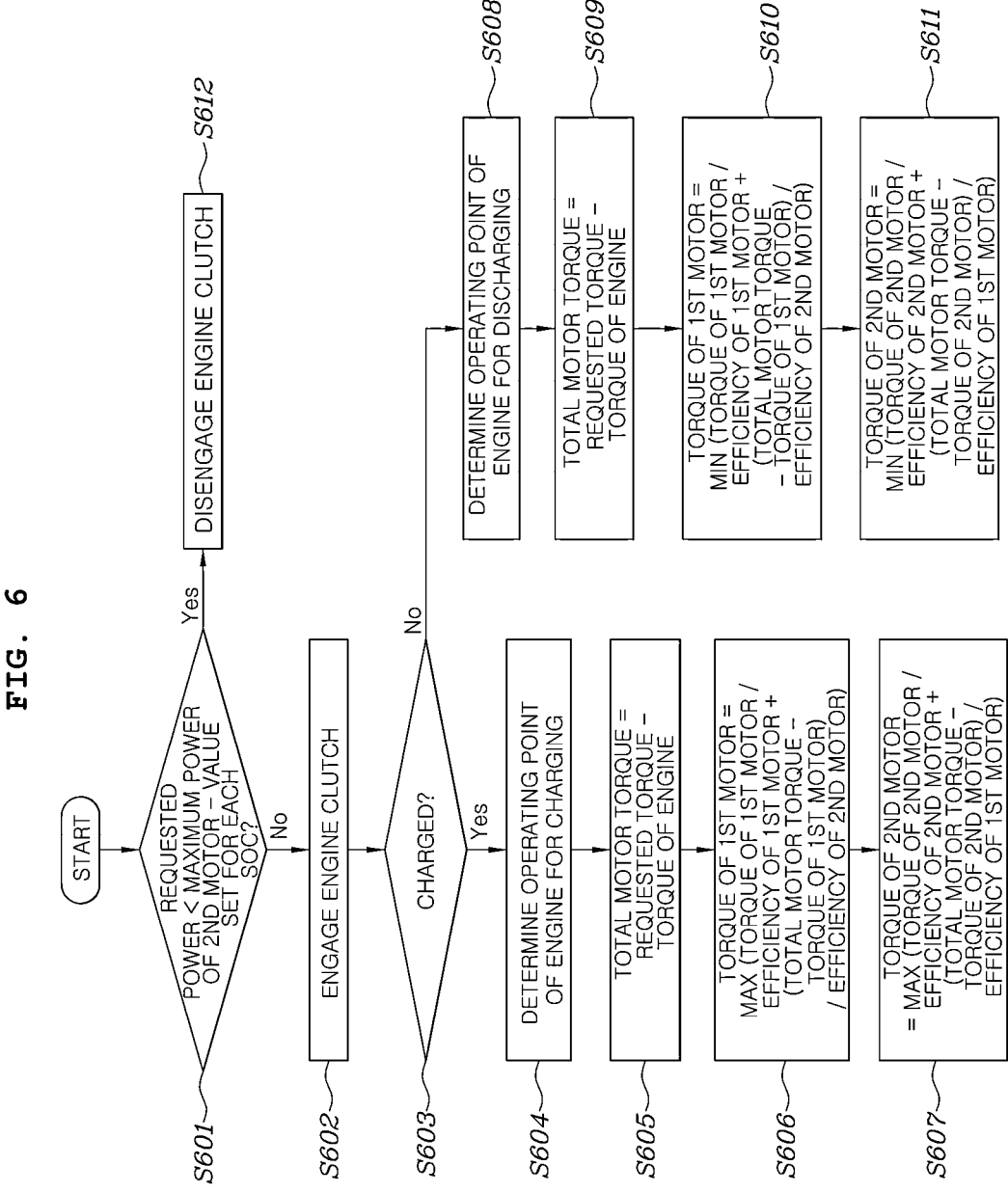
FIG. 6 is a flowchart illustrating a process of controlling the hybrid electric vehicle in a second driving mode according to an embodiment of the present disclosure.

FIG. 6 is a flowchart illustrating a process of controlling the hybrid electric vehicle in the second driving mode according to an embodiment of the present disclosure.

Referring to FIG. 6, when the sum of the value set for each SOC of the battery 170 and the requested driving power is greater than the maximum power of the second motor 140 (No in S601), the driving mode controller 310 may determine that the second motor 140 alone is not capable of satisfying the requested driving power and may perform control such that the engine clutch 130 is engaged (S602).

When the engine clutch 130 is engaged and the battery 170 is charged (Yes in S603), the engine operating point controller 320 may determine the operating point of the engine 110 for charging based on the efficiency map described with reference to FIG. 4 (S604). When the engine clutch 130 is engaged and the battery 170 is discharged (No in S603), the engine operating point controller 320 may determine the operating point of the engine 110 for discharging based on the efficiency map described with reference to FIG. 4 (S608).

When the engine clutch 130 is engaged and the battery 170 is charged (Yes in S603), the motor operating point controller 330 may determine the total motor torque to be a value obtained by subtracting the torque output from the engine 110 at the operating point of the engine 110 determined by the engine operating point controller 320 from the requested driving torque (S605). When the engine clutch 130 is engaged and the battery 170 is discharged (No in S603), the motor operating point controller 330 may determine the total motor torque to be a value obtained by subtracting the torque output from the engine 110 at the operating point of the engine 110 determined by the engine operating point controller 320 from the requested driving torque (S609).

When the engine clutch 130 is engaged and the battery 170 is charged (Yes in S603), the motor operating point controller 330 may determine total motor applied torque based on the determined total motor torque and the output efficiency of each of the first motor 120 and the second motor 140 and may determine the operating point of each of the first motor 120 and the second motor 140 based on the total motor applied torque (S606 and S607). When the engine clutch 130 is engaged and the battery 170 is discharged (No in S603), the motor operating point controller 330 may determine total motor applied torque based on the determined total motor torque and the output efficiency of each of the first motor 120 and the second motor 140 and may determine the operating point of each of the first motor 120 and the second motor 140 based on the total motor applied torque (S610 and S611).

In more detail, the total motor applied torque may be calculated by adding a value obtained by dividing the torque of the first motor 120 by the output efficiency of the first motor 120 to a value obtained by dividing the torque of the second motor 140 (=the total motor torque−the torque of the first motor 120) by the output efficiency of the second motor 140.

When the battery 170 is charged (Yes in S603), the motor operating point controller 320 may determine the operating point of each of the first motor 120 and the second motor 140 such that the total motor applied torque is maximized (S606 and S607). When the battery 170 is discharged (No in S603), the motor operating point controller 320 may determine the operating point of each of the first motor 120 and the second motor 140 such that the total motor applied torque is minimized (S610 and S611).

When the sum of the value set for each SOC of the battery 170 and the requested driving power is less than the maximum power of the second motor 140 (Yes in S601), the driving mode controller 310 may perform control such that the engine clutch 130 is disengaged (S612).

Figure 7:
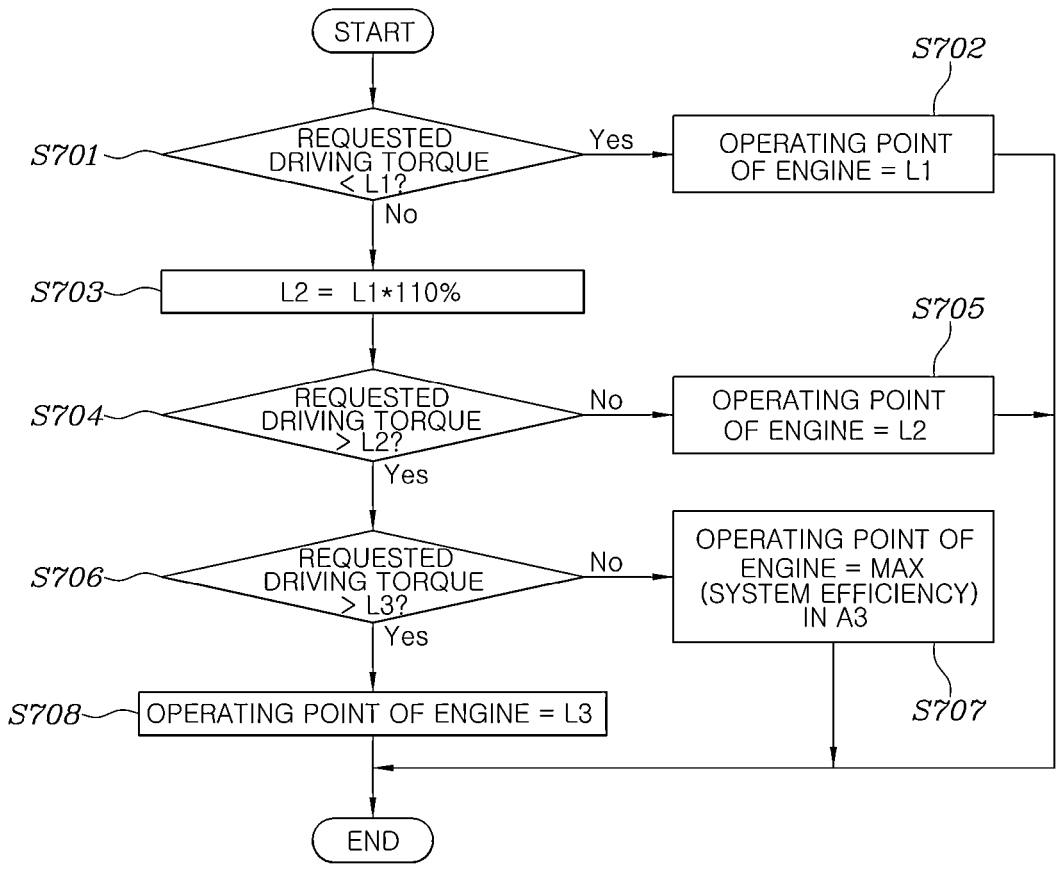
FIG. 7 is a flowchart illustrating a process of determining the operating point of the engine when the hybrid electric vehicle is controlled in the second driving mode according to an embodiment of the present disclosure.

FIG. 7 is a diagram showing a process of determining the operating point of the engine when the hybrid electric vehicle is controlled in the second driving mode according to an embodiment of the present disclosure.

Referring to FIG. 7, when the requested driving power corresponds to the region A1 below the first line L1 (Yes in S701), the engine operating point controller 320 may determine the operating point of the engine 110 to be an operating point on the first line L1 (S702).

When the requested driving power does not correspond to the region A1 below the first line L1 (No in S701), the second line L2 may be set to have a predetermined difference in efficiency of the engine 110 from the first line L1. For example, the second line L2 may be set to be 110% of the first line L1 (S703).

When the requested driving power corresponds to the region A2 between the first line L1 and the second line L2 (No in S704), the engine operating point controller 330 may determine the operating point of the engine 110 to be an operating point on the second line L2 (S705).

When the requested driving power corresponds to the region A3 between the second line L2 and the third line L3 (No in S706), the engine operating point controller 330 may determine the operating point of the engine 110 to be an operating point on the region A3 between the second line L2 and the third line L3, at which the system efficiency is maximized (S707).

When the requested driving power corresponds to the region above the third line L3 (Yes in S706), the engine operating point controller 320 may determine the operating point of the engine 110 to be an operating point on the third line L3 (S708).

The process of controlling the operating points by the engine operating point controller 320 has been described above in detail with reference to FIG. 4.

FIG. 8 is a diagram showing a process of controlling the hybrid electric vehicle in the third driving mode according to an embodiment of the present disclosure.

Referring to FIG. 8, when the requested deceleration power is greater than the charging power of the battery 170 (Yes in S801) or when the driver setting mode is a sport mode (Yes in S802), the driving mode controller 310 may perform control such that the engine clutch 130 is engaged and the engine 110 is driven (S803) and may interrupt the supply of fuel to the engine 110 (S804), with the result that the engine 110 produces torque due to friction.

The motor operating point controller 330 may determine the total motor torque to be a value obtained by subtracting the torque of the engine 110 caused by interruption of the supply of fuel to the engine 110 from the requested deceleration torque (S805) and may determine the total motor applied torque based on the determined total motor torque, the output efficiency of the first motor 120, and the output efficiency of the second motor 140. The motor operating point controller 330 may determine the operating point of each of the first motor 120 and the second motor 140 such that the determined total motor applied torque is maximized (S806 and S807).

According to the various embodiments of the present disclosure described above, the system efficiency of a hybrid electric vehicle equipped with a plurality of motors may be improved, and thus the fuel efficiency thereof may be improved. Furthermore, the marketability of the hybrid electric vehicle may be improved.

The present disclosure described above may be implemented as code that can be written on a computer-readable recording medium and thus read by a computer system. The computer-readable recording medium includes all kinds of recording devices in which data that may be read by a computer system are stored. Examples of the computer-readable recording medium include a Hard Disk Drive (HDD), a Solid-State Disk (SSD), a Silicon Disk Drive (SDD), a ROM, a RAM, a CD-ROM, a magnetic tape, a floppy disc, and an optical data storage.

As is apparent from the above description, according to the various embodiments of the present disclosure, the system efficiency of a hybrid electric vehicle equipped with a plurality of motors may be improved, and thus the fuel efficiency thereof may be improved. Furthermore, the marketability of the hybrid electric vehicle may be improved.

However, the effects achievable through the disclosure are not limited to the above-mentioned effects, and other effects not mentioned herein should be clearly understood by those having ordinary skill in the art from the above description.

The above detailed description is not intended to be construed to limit the disclosure in all aspects and to be considered by way of example. The scope of the present disclosure should be determined by reasonable interpretation of the appended claims and all equivalent modifications made without departing from the present disclosure should be included in the following claims.

What is claimed is:

1. A hybrid electric vehicle comprising:
an engine clutch connected at one end of the engine clutch to a first motor and connected at another end of the engine clutch to a second motor, the first motor being directly connected to an engine;
a battery electrically connected to the first motor and the second motor; and
a controller configured, when the engine is driven in an engaged state of the engine clutch, to:
determine an operating point of the engine based on a predetermined efficiency map,
determine total motor torque to be output by a motor unit comprising the first motor and the second motor based on the operating point of the engine, and
determine an operating point of each of the first motor and the second motor based on total motor applied torque causing the motor unit to output the total motor torque and whether the battery is charged or discharged.

2. The hybrid electric vehicle according to claim 1, wherein the controller performs comparison between requested driving power and maximum power of the second motor and controls engagement and disengagement of the engine clutch based on a result of the comparison.

3. The hybrid electric vehicle according to claim 2, wherein the controller is further configured to control engagement and disengagement of the engine clutch based on a state of charge (SOC) of the battery.

4. The hybrid electric vehicle according to claim 1, wherein the total motor applied torque is determined based on the total motor torque and efficiency of each of the first motor and the second motor.

5. The hybrid electric vehicle according to claim 1, wherein, when the battery is charged, the controller determines the operating point of each of the first motor and the second motor such that the total motor applied torque is equal to or greater than a predetermined first value.

6. The hybrid electric vehicle according to claim 1, wherein, when the battery is discharged, the controller determines the operating point of each of the first motor and the second motor such that the total motor applied torque is equal to or less than a predetermined second value.

7. The hybrid electric vehicle according to claim 1, wherein the efficiency map is sectioned into a plurality of regions at least by a first line set to correspond to an optimum operating line (OOL) of the engine, a second line set to have a predetermined difference in engine efficiency from the first line, or a third line set to maximize part load of the engine.

8. The hybrid electric vehicle according to claim 7, wherein, when requested driving power corresponds to a region below the first line, the controller determines the operating point of the engine to be an operating point on the first line.

9. The hybrid electric vehicle according to claim 7, wherein, when requested driving power corresponds to a region between the first line and the second line, the controller determines the operating point of the engine to be an operating point on the second line.

10. The hybrid electric vehicle according to claim 7, wherein, when requested driving power corresponds to a region between the second line and the third line, the controller determines the operating point of the engine to be an operating point causing system efficiency to be equal to or greater than a predetermined value in the region between the second line and the third line, and wherein the system efficiency is determined based on output efficiency of the engine, efficiency of transfer of power to driving wheels, and charging/discharging efficiency of the battery.

11. The hybrid electric vehicle according to claim 7, wherein, when requested driving power corresponds to a region above the third line, the controller determines the operating point of the engine to be an operating point on the third line.

\*   \*   \*   \*   \*